United States Patent [19]
Emmons

[11] Patent Number: 5,181,588
[45] Date of Patent: Jan. 26, 1993

[54] OPEN FRAMEWORK DISC BRAKE CALIPER HAVING AN ELASTOMERIC CYLINDER LINER

[76] Inventor: J. Bruce Emmons, 1711 W. Hamlin Rd., Rochester, Mich. 48309

[21] Appl. No.: 696,425

[22] Filed: May 6, 1991

[51] Int. Cl.⁵ .............................................. F16D 35/00
[52] U.S. Cl. .................. 188/73.31; 188/71.1; 188/73.45; 92/170.1; 92/130 R
[58] Field of Search .................. 188/72.1, 72.3, 72.4, 188/73.31, 73.44, 73.45, 73.32, 71.8, 196 P, 370, 73.39, 73.47; 92/170.1, 130 R; 192/85 R, 85 A, 85 AA

[56] References Cited

U.S. PATENT DOCUMENTS

| | | | |
|---|---|---|---|
| 1,621,858 | 3/1927 | Sherwood | 92/170.1 |
| 3,051,272 | 8/1962 | Burnett | 188/73.34 |
| 3,084,717 | 4/1963 | Purcell | 138/31 |
| 3,156,325 | 11/1964 | Taylor | 188/73 |
| 3,442,356 | 5/1969 | Hahm | 188/72.4 |
| 3,482,656 | 12/1969 | Shakespear | 188/73 |
| 3,575,268 | 4/1971 | Kimata | 188/71.8 X |
| 3,696,714 | 10/1972 | Panigati | 92/170.1 |
| 3,887,045 | 6/1975 | DeHoff | 188/73.3 |
| 4,034,858 | 7/1977 | Rath | 188/73.3 |
| 4,194,597 | 3/1980 | Evens et al. | 188/73.5 |
| 4,220,224 | 9/1980 | Karasudani | 188/73.3 |
| 4,222,465 | 9/1980 | Haraikawa | 188/73.5 |
| 4,306,639 | 12/1981 | Mitchell | 188/370 |
| 4,342,380 | 8/1982 | Melinat | 188/71.1 |
| 4,352,498 | 10/1982 | Burke et al. | 188/72.3 X |
| 4,494,630 | 1/1985 | Stoka et al. | 188/72.3 X |
| 4,537,288 | 8/1985 | Stoka | 188/71.8 |
| 4,573,554 | 3/1986 | Ritsema | 188/73.39 X |
| 4,576,257 | 3/1986 | Carre et al. | 188/73.32 |
| 4,606,439 | 8/1986 | Meynier et al. | 188/73.32 |
| 4,609,079 | 9/1986 | Méry | 188/73.32 X |
| 4,662,483 | 5/1987 | Boeck | 188/72.3 |
| 4,792,289 | 12/1988 | Nieratschker | 417/259 |
| 4,823,920 | 4/1989 | Evans | 188/72.4 X |
| 5,022,500 | 6/1991 | Wang | 188/73.39 X |

Primary Examiner—Robert J. Oberleitner
Assistant Examiner—Peter M. Poon
Attorney, Agent, or Firm—Dykema Gossett

[57] ABSTRACT

A disk brake caliper comprises a cast body including an inboard support, an outboard support, and an open framework interconnecting both supports. The caliper body includes a cast brake cylinder closed at one end arranged inwardly of the framework and extending through the inboard support. The cylinder has a liner of elastomeric material bonded to its interior and yieldably receives a pressure piston of cylindrical shape. The method of forming a liner within the cylinder includes inserting a polished steel plug mold into the cylinder having a bore and an end wall which are coated with a bonding agent, uniformly spacing the plug mold from the cylinder bore and end wall, clamping the mold upon the cylinder, injecting uncured rubber through a passage in the mold and filling the space between the cylinder and the plug and curing the rubber until it adheres and is bonded to the cylinder.

13 Claims, 4 Drawing Sheets

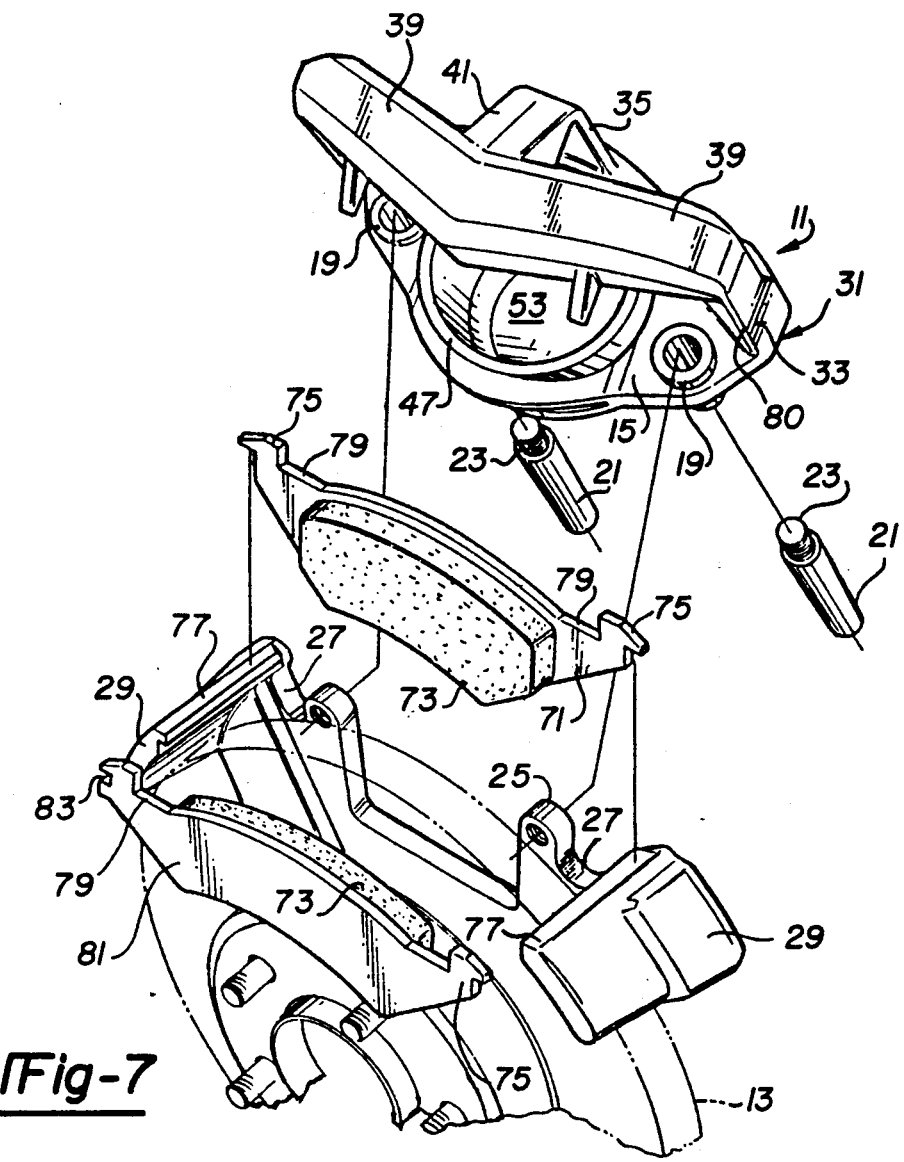
IFig-7
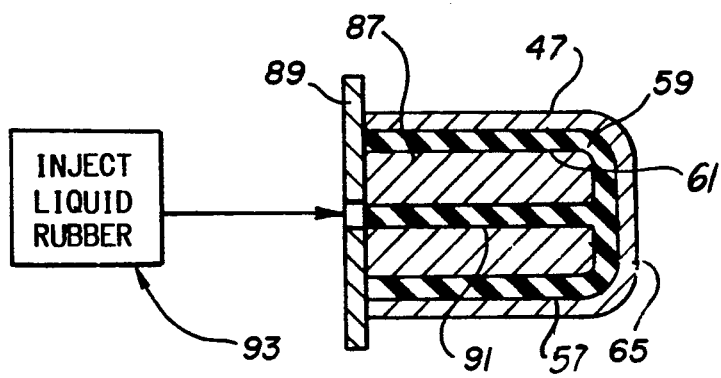
IFig-8

OPEN FRAMEWORK DISC BRAKE CALIPER HAVING AN ELASTOMERIC CYLINDER LINER

FIELD OF INVENTION

Relates to disc brakes for vehicles and more particularly to an improved disc brake caliper.

BACKGROUND OF THE INVENTION

In the design of a disc brake caliper for an automotive application, it is important to consider the effect the caliper has on the pedal feel that the driver experiences. For the best sense of control, and minimum reaction times, the pedal should have a firm feel, with a minimum of free travel before engagement. The structural stiffness of the caliper is the primary contributor to the firmness of the pedal, and should be made as high as possible within a reasonable mass. A limitation to the structural efficiency of current caliper designs is the need to machine the cylinder bore. This operation requires a large access notch in the outboard side of the caliper, causing a structural discontinuity.

Free travel results largely from the need to retract the brake pads slightly from the surface of the brake rotor to minimize the drag of the brakes when they are not being applied. A small but consistent value for the amount of retraction is desired. The retraction function is typically performed in disc brake calipers by the elastomeric seal between the piston and the cylinder bore. Most current designs use an o-ring of square cross-section located in a groove machined into the inside wall of the cylinder bore. The extension of the piston due to the application of hydraulic pressure, causes the seal to be deformed in shear by the friction forces at the surface of the piston. When the hydraulic pressure is released, the piston is drawn back slightly by the elastic stresses stored in the seal. One disadvantage of this approach is that the retraction force produced by the seal must overcome the somewhat variable friction forces between the cylinder bore and the close fitting piston. Variability is created by normal manufacturing tolerances for the piston and cylinder bore, cocking of the piston due to caliper deflection and uneven brake pad wear, corrosion or dirt between the piston and bore, thermal expansion of the piston, and the shape and dimensions of the o-ring groove. This variability can be controlled to some degree by tightening the manufacturing tolerances on the various components, but this adds cost.

THE PRIOR ART

Illustrations of prior art disclosures of disc brake calipers are set forth in one or more of the following U.S. patents.

| Inventor | U.S. Pat. No. | Title/Date |
| --- | --- | --- |
| R. T. Burnett | 3,051,272 | Improvement for Disk Brake Structure; August 28, 1962 |
| W. R. Taylor | 3,156,325 | Spot-Type Disc Brakes; November 10, 1964 |
| H. Shakespear | 3,482,656 | Disc Brake Caliper Body; December 9, 1969 |
| DeHoff, et al. | 3,887,045 | Disc Brake Caliper Assembly and Method; June 3, 1975 |
| Rath | 4,034,858 | Support Structure for Disc Brake Caliper; July 12, 1977 |
| Karasudani | 4,220,224 | Disc Brake; September 2, 1980 |
| Evans, et al. | 4,194,597 | Disc Brake Anti-Rattle Means; March 25, 1980 |
| Haraikawa, et al. | 4,222,465 | Disc Brake Friction Pad Retaining Structure; September 16, 1980 |
| Melinat | 4,342,380 | Light Weight Disc Brake Caliper; August 3, 1982 |
| Carre, et al. | 4,576,257 | Disc Brake with Removable Caliper Reinforcing Arm; March 13, 1986 |
| Meynier, et al. | 4,606,439 | Disc Brake; August 19, 1986 |

Examples of cylinders with flexible walls are found in the following U.S. patents:

| Inventor | U.S. Pat. No. | Title/Date |
| --- | --- | --- |
| H. M. Purcell | 3,084,717 | Piston Type Accumulator with Flexible Cylinder Wall; April 9, 1963 |
| Panigati | 3,696,714 | Fluid-Operated Cylinder; October 10, 1972 |
| Nieratschker | 4,792,289 | Reciprocating Pump for Cryogenic Fluids; December 20, 1988 |

SUMMARY OF THE INVENTION

An important feature of the present invention is to provide an improved disc brake caliper which eliminates and overcomes most if not all of the foregoing difficulties found in the prior art calipers.

One feature is the provision of a novel caliper including the structure and design of the casting, the piston and seal arrangement and the method of manufacture of the caliper. Another feature is to increase the stiffness and reduce the weight of the caliper, to reduce the manufacturing costs, and to reduce the initial investment in tooling and equipment.

It is another feature to provide a cylinder as an integral part of the cast caliper that does not require machining; and therefore, does not require the conventional access notch previously required for such machining. In the place of machining there is provided within the cylinder a liner of rubber or elastomeric material which using a suitable mold is molded and cured upon the interior of the cylinder.

It is typical practice for a brake caliper piston to maintain a close tolerance fit between the piston and cylinder bore and to use an O-ring type seal, usually square in cross section, nested in a groove formed within the cylinder. The present invention includes the important feature of employing a rubber or elastomeric liner which is molded into the cylinder bore forming a smooth cylindrical surface.

Another feature includes a piston which fits into this bore and which has an outer machined surface having a number of circumferential ribs which press into the rubber liner thereby forming a multi-staged seal.

This arrangement has a number of advantages:

The liner undergoes an elastic shear deformation as the piston extends under hydraulic pressure. When the pressure is released, the liner pulls the piston back to minimize brake drag. There are no sliding parts to create friction which might interfere with this action. Machining of the cylinder bore is unnecessary. The piston floats in a layer of rubber or other elastomeric material. All metal contact is eliminated and this accommodates for misalignment and thermal expansion minimizes friction and binding and there is no need for a protective rubber boot or bellows as has been the case heretofore.

As another feature the present caliper responds to and compensates for uneven wear of the brake pads and rotor. A further feature is to take advantage of the near net shape and thin wall capabilities of the vacuum assisted casting process or related process that is employed. Because of the relative precision of this casting process and the seal innovations, no machining is required in the manufacture of the caliper. It is an important feature in addition to the usual cope and drag (top and bottom halves of the sand mold) there is employed a single core to form the cylinder bore and the inside surface of the beams of the outboard support. This provides for good control over the perpendicularity between the cylinder axis and the outboard brake mounting surface.

These and other features and objects will be seen from the following specification and claims in conjunction with the appended drawings.

THE DRAWINGS

FIG. 7 is a schematic exploded view of a caliper and its internal mechanism for support upon a vehicle and assembly of the backing plates for the friction pads.

FIG. 8 is a fragmentary section of the apparatus for molding the cylinder liner.

It will be understood that the above drawings are merely illustrative of a preferred embodiment of the invention and that other embodiments are contemplated within the scope of the claims hereafter set forth.

DETAILED DESCRIPTION OF AN EMBODIMENT OF THE INVENTION

Figure 1:
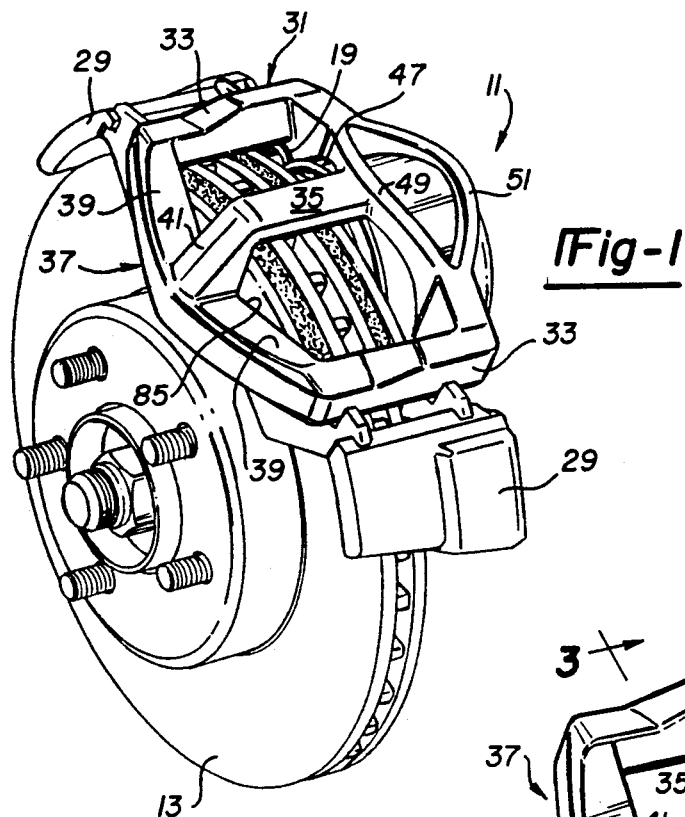
FIG. 1 is a front perspective view of the present disc brake caliper arranged in a use position with respect to brake rotor or disc of a vehicle.
Figure 2:
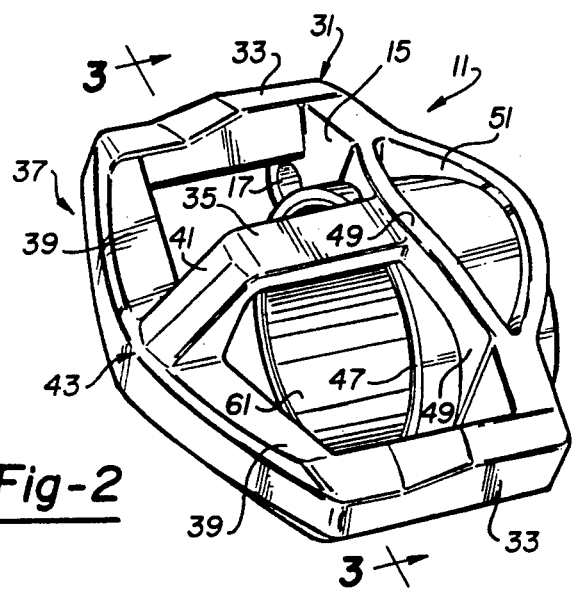
FIG. 2 is a front perspective view of the brake caliper on an increased scale.

The present disc brake caliper as a cast unit preferably of steel, is generally illustrated at 11, FIGS. 1 and 2 and shown in its position of use with respect to the wheel disc or brake rotor 13 for a vehicle in FIG. 1.

The unit cast brake caliper, FIG. 2, includes inboard support 15 having a pair of laterally spaced circular apertures 17 therethrough adapted to receive flexible bushings 19, preferably of rubber or similar composition, through which project the support pins 21, FIG. 7.

Said support pins have threaded ends 23 which threadedly extend into corresponding apertures within the laterally spaced upright bosses 25 of the conventional anchor plate 27.

Said anchor plate includes at its ends a pair of laterally extending arms 29 which generally overlie the rotor 13 and are connected to a part of the vehicle, such as the brake arm or steering knuckle, of a conventional nature and not shown and in an assembly similar to that shown in U.S. Pat. No. 4,194,597 referred to above. The present caliper 11 includes a unit caliper body 31, FIG. 2. A pair of longitudinally spaced parallel bridge members 33, sometimes referred to as heavy section bridge members, at their one ends are connected to outer end portions of the inboard support 15, and at their other or second ends are connected to the outboard support 37.

A central bridge member 35, sometimes referred to as a light section bridge member with respect to the cross-section of the bridge members 33 at its one end is connected to a central portion of inboard support 15. Its other or second end is connected to the outboard support 37. Said outboard support 37 is spaced from the inboard support 15 and is fixedly connected at the second ends of the bridge members 33 and 35.

Figure 4:
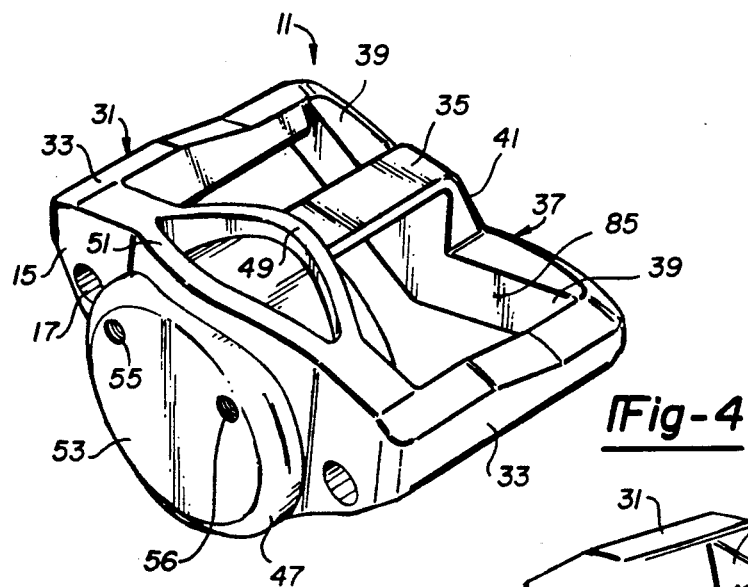
FIG. 4 is a perspective view of the brake caliper as viewed from a direction opposite from that shown in FIG. 2.

The outboard support 37 includes a pair of generally aligned transverse beam members 39, connected together at their inner ends and having outer ends connected to the second ends of the bridge members 33, FIG. 2. The outboard support further includes an inclined beam member 41 which extends from the second end of the central bridge member 35 and is connected to the junction of the transverse beam members 39 as at 43, FIG. 2. The respective beam members 39 and 41 have upright inner surfaces shown at 85, FIG. 4, which are co-planar and normally lie in a plane at right angles to the longitudinal axis 45 of the unit cast cylinder 47 forming a part of the caliper body 31.

The brake cylinder 47 has a closed end or end wall 53 which is circular and generally convex and includes a threaded pressure fitting aperture 55 for receiving pressurized fluids in a conventional manner. A similar threaded aperture 56 for a conventional air bleed valve is included. The cylinder 47 has a cast cylindrical bore 57 also arranged upon the longitudinal axis 45, FIG. 3. Said axis is arranged centrally of cylinder 47 and extends at right angles to a plane passing through the interior walls 85 of the outboard support 37, FIGS. 2 and 4. Forming a part of the unit cast caliper and integral with the inboard support 15 are a pair of arcuate or curved opposed ribs 49, 51 through which the cylinder 47 projects along its length. Upon its top and bottom areas as a unit part of the construction the cylinder is rigidly supported within the inboard support 15 and ribs 49, 51 of the unit cast brake caliper.

The present caliper is designed to take advantage of the near net shape and thin wall capabilities of the vacuum assist casting process employed, however, other casting processes may also be used.

Figure 3:
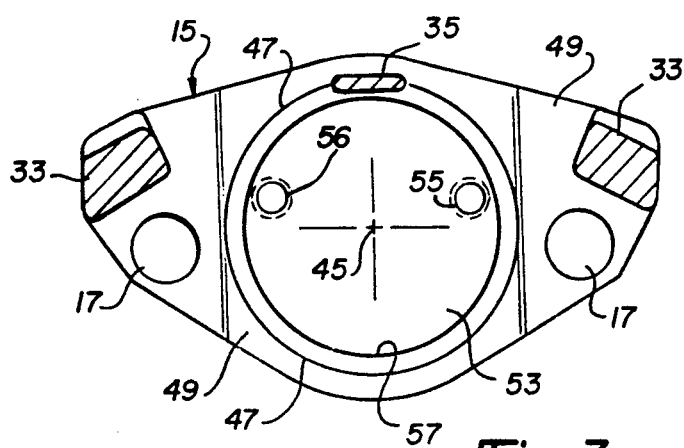
FIG. 3 is a transverse section taken in the direction of arrow 3—3 of FIG. 2.

Because of the relative precision of this casting process and the seal innovations, little or no machining is necessary in the manufacture of this caliper and particularly the cylinder bore 57, FIG. 3.

In addition to the usual cope and drag (top and bottom halves of the sand mold) a single core is used to form the cylinder bore 57 including its end wall 53 and the inside surface portions 85 of the outer support beams 39 and 41. This allows good control over the perpendicularity, namely between the longitudinal axis 45 of cylinder 47 and the outboard brake pad mounting surface 85, FIG. 4.

The elastomer or rubber liner 59 is molded directly into the as cast cylinder 47 and bonded to it in the process. In FIG. 8 there is fragmentarily shown as cast cylinder 47 within which is positioned the plug or mold 87 constructed of a polished steel. It is clamped to the cylinder at 89 and includes a passage 91 through which is injected at 93 uncured rubber or other elastomeric material filling the space between plug 87, the cylinder bore 57 and the end wall 65. After a period sufficiently long to permit the curing of the rubber or other elastomeric material 59, up to 15 minutes, it hardens and bonds, with the aid of a bonding agent to the interior surface of cylinder 47 and its end wall 65. This provides upon its interior a smooth cylindrical bore 61.

The foregoing method of forming a lining upon the interior wall of a cast cylinder includes the steps of; coating the interior surface of the cylinder with a bonding agent; concentrically inserting a polished steel plug mold into said cylinder upon its axis, uniformly spaced from said bore and end wall; clamping the mold in a fixed position upon said cylinder; injecting uncured rubber through a port in the plug into and filling the space between the cylinder, plug and end wall; and curing the rubber until it hardens and bonds to the entire surface of said cylinder and end wall, removal of said plug leaving a smooth bore in said liner.

An alternative method includes the steps of coating the interior surfaces of the cylinder with a bonding agent; inserting a predetermined volume of uncured rubber into the cylinder; using force to ram a polished steel plug mold into place, squeezing the rubber into the space between the mold and the cylinder; clamping the mold in place; and curing the rubber until it hardens and bonds to the entire surface of said cylinder and end wall, removal of the plug mold leaving a smooth bore in said liner.

The metallic piston 63 is constructed of stainless steel, for illustration and has a closed end wall 65 at one end arranged adjacent to and spaced from the corresponding end wall 53 of cylinder 47 and yieldably nested within the cylinder lining 59.

Figure 5:
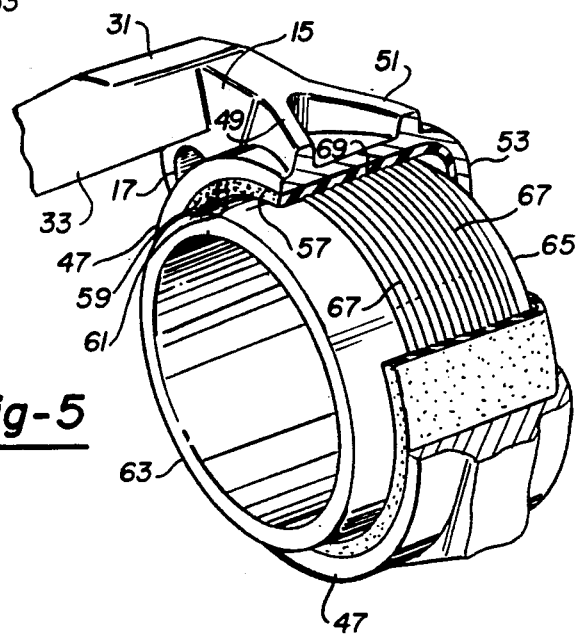
FIG. 5 is a fragmentary broken away perspective view of the caliper, cylinder, lining and piston.

Said piston includes at least one or a plurality of circumferential ribs 67 machined therein or alternately a plurality of annular undulations. The piston is then pressed into the rubber liner 59 partly deforming the liner such as shown at 69, FIG. 5. There is thus established a yielding relation between the piston 63 and the liner 59 so that the piston yieldably floats within the liner. Actually, in operation, there is no relative sliding of the piston with respect to the cylinder liner surface except to accommodate wear of the brake pads. When the cylinder and piston have been pressurized as at the port 55, FIG. 3, the liner undergoes an elastic shear deformation as the piston extends under hydraulic pressure. It is this extending limited movement which is sufficient to apply braking force to the corresponding inboard and outboard conventional backing plates 71 and 81 which mount the corresponding friction pads 73. This is sufficient frictional force application to opposite peripheral surface portions of the rotor 13 for application of the vehicle brakes.

Figure 6:
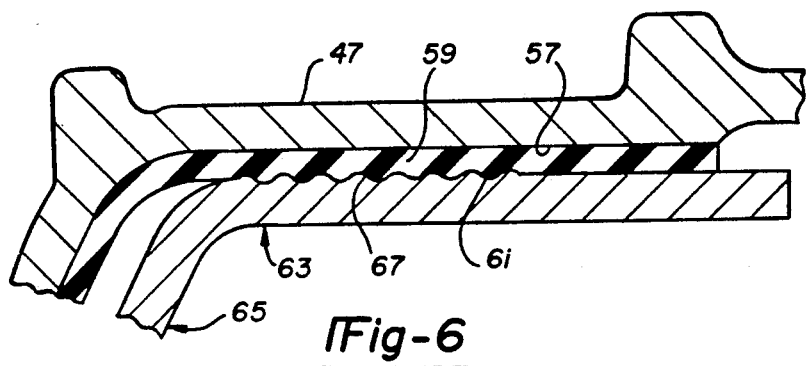
FIG. 6 is a fragmentary section taken on an increased scale illustrating the construction of the cylinder, its molded liner and a portion of the piston therein.

The cylinder bore presents a smooth cylindrical surface 61 which includes the rubber or elastomeric liner into which the piston is projected with its circumferential ribs 67, FIG. 6. In view of the series of ribs 61, there is provided a multi-staged seal which extends longitudinally over substantially a major portion of the length of the piston and with respect to corresponding length of the cylinder 47. Thus, there are no sliding parts to create friction that might otherwise interfere with this action. On release of pressure from the piston there is an automatic return movement of the piston due to its resilient mount within the liner. This construction eliminates metal to metal contact and thus accommodates any misalignment or thermal expansion and minimizes friction and/or any binding.

There is no need for a protective rubber boot or bellows, as has been the practice.

Figure 6A:
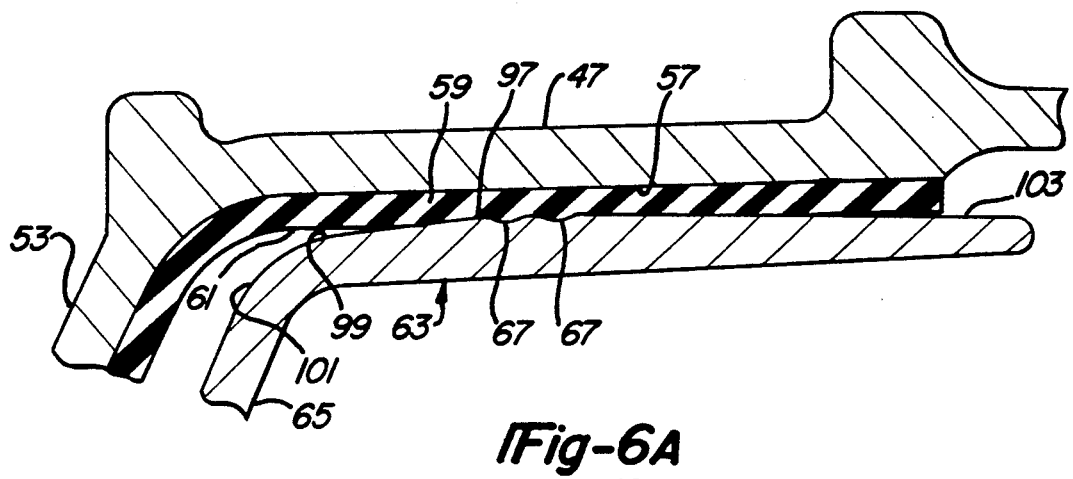
FIG. 6A is a similar view showing a modified piston.

FIG. 6A is similar to FIG. 6, but shows a modified piston 63. Intermediate its ends are a plurality of spaced annular ridges 67 of arcuate cross-section. These ridges and adjacent outer wall portions 97 are oversized relative to the bore 61 of liner 59.

Inner wall portions 99 are inclined inwardly away from the liner bore 61 at an angle of about 1 to 5 degrees. Wall portions 99 merge with curved portions 101 of piston wall 65.

This provides for less contact and interference of piston 63 with liner 59 on initial assembly.

Outer wall portions 103, piston 63, extending from ridges 67 are inclined inwardly away from bore 61.

Figure 6B:
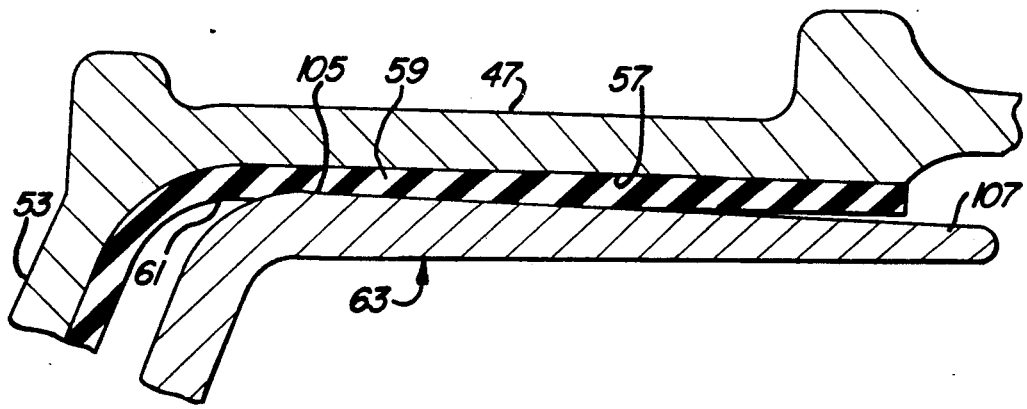
FIG. 6B is a similar view showing another modified piston.

FIG. 6B shows a further modification of piston 63 whose outer wall 105 adjacent to end wall 65 is of maximum diameter. This is greater than the internal bore 61 of liner 59. As the piston is fully assembled in an initial retracted position within cylinder 47 a major portion of the piston is compressively nested and yieldably sealed within liner 59.

Said piston is annular and is of converging outer shape at 107 extending away from liner 59. The angle is approximately 1 to 5 degrees.

This provides for less contact and interference of piston 63 with liner 59 on initial assembly.

Referring to FIG. 7, the inboard conventional backing plate 71 mounts the friction brake pad 73 in a conventional manner upon one side of the rotor or wheel disc 13. The inboard backing plate has a pair of notched supports 75 at its opposite ends. These cooperatively overlie the transverse tracks 77 upon the opposed arms 29 in a conventional manner, which construction to some extent is shown in the above U.S. Pat. No. 4,194,597.

At opposite ends of the backing plate 71, and likewise the backing plate 81 shown in FIG. 7, there are a pair of hold down faces 79 which are engaged by undersurface portions 80 of the beam members 33.

The outboard backing plate 81 is of a similar construction to backing plate 71 and mounts a corresponding friction brake pad 73 to operably engage the opposite side of disc 13. On one end of backing plate 81 there is provided a corresponding notch support 75 registerable with one of the tracks 77 upon arm 29. The opposite end of outboard backing plate 81 is notched as at 83 in order to cooperatively receive the corresponding track 77 on the opposing arm 29 for an improved interlock therewith.

It is seen from this construction that the respective inboard and outboard backing plates 71 and 81, in a conventional manner are supportably and slidably mounted upon the respective tracks 77 of the arms 29 in a manner shown in U.S. Pat. No. 4,194,597, and not actually a part of the present invention.

Having described my invention, reference should now be had to the following claims.

I claim:

1. A disc brake caliper comprising a unit cast body including an inboard support;
   an outboard support spaced from said inboard support as a part of said body;

an open framework as a part of said body rigidly interconnecting said inboard and outboard supports;

a brake cylinder having a closed end wall formed on and a part of and projecting through said inboard support arranged inwardly of said framework and having a bore with an open end, extending on a longitudinal axis;

a liner of elastomeric material encompassing substantially the entire cylinder wall of and bonded to said bore and having a smooth cylindrical surface; and a piston compressively and yieldably nested and sealed within said liner.

2. In the disc brake caliper of claim 1, further comprising said piston having a smooth cylindrical surface.

3. In the disc brake caliper of claim 1, further comprising said inboard support including opposed arcuate ribs, intermediate their ends receiving and supportably engaging around said cylinder along its length and upon its top and bottom as an integral part thereof and being outwardly bowed and extending transversely of said axis.

4. In the disc brake caliper of claim 1, further comprising said liner being molded and adhered upon the bore of said cylinder and being of substantially uniform thickness.

5. A disc brake caliper comprising a unit cast body including an inboard support;

an outboard support spaced from said inboard support as a part of said body;

an open frame work as a part of said body rigidly interconnecting said inboard and outboard supports;

a brake cylinder having a closed end wall formed on and a part of and projecting through said inboard support arranged inwardly of said framework and having a bore with an open end, extending on a longitudinal axis;

a liner of elastomeric material bonded to said bore and having a smooth cylindrical surface;

a piston compressively and yieldably nested and sealed within said liner;

said piston being of said cylindrical shape and having a transverse end wall; and at least one circumferential rib on said piston pressed into said liner and forming a seal relative to said liner.

6. In the disc brake caliper of claim 5, there being a plurality of longitudinally spaced ribs on said piston pressed into said liner and forming a multiple staged seal along the length of said liner.

7. In the disc brake caliper of claim 6, said ribs being curved to their outer edges and yieldably embedded into said liner;

pressurizing said cylinder and piston effecting a limited elastic shear deformation of said liner as the piston extends axially, without movement relative to said liner; and the liner automatically returning the piston on release of pressure thereto, said piston floating in the layer of elastomeric material.

8. In the disc brake caliper of claim 6, further comprising said ribs at their outer edges being rounded.

9. In the disc brake caliper of claim 8, further comprising said ribs having a maximum diameter greater than the internal diameter of said liner.

10. In the disc brake caliper of claim 5, further comprising said piston being of cylindrical shape and having a transverse end wall, said liner extending over and bonded to said cylinder end wall and spaced from said piston end wall.

11. In the disc brake caliper of claim 5, further comprising said piston being of cylindrical shape and having a transverse end wall, end portions of said piston being curved radially inward and merging with said piston end wall;

said piston being generally cylindrical, and being tapered inwardly towards its open end and being progressively oversized relative to said liner towards the closed end of said cylinder.

12. In the disc brake caliper of claim 5, further comprising a plurality of spaced annular ridges upon said piston of arcuate cross-section arranged intermediate its ends for yielding sealing engagement with said liner.

13. In the disc brake caliper of claim 12, further comprising a portion of said piston towards its rear wall having an annular taper of reduced diameter spaced from said lining, extending at an angle of about 1 to 5 degrees from said lining.

* * * * *